(12) United States Patent
Levin et al.

(10) Patent No.: US 6,885,314 B2
(45) Date of Patent: Apr. 26, 2005

(54) HAND-HELD INPUT DEVICE PARTICULARLY USEFUL AS A KEYBOARD

(76) Inventors: Dror Levin, 15 Trompeldor Street, 32 581 Haifa (IL); Eyal Sarid, 29 Aluf Hanitzachon Street, 57 367 Ramat Gan (IL)

( * ) Notice: Subject to any disclaimer, the term of this patent is extended or adjusted under 35 U.S.C. 154(b) by 435 days.

(21) Appl. No.: 09/930,454

(22) Filed: Aug. 16, 2001

(65) Prior Publication Data

US 2003/0034903 A1 Feb. 20, 2003

(51) Int. Cl.[7] ............................................. H03K 17/94
(52) U.S. Cl. ............................................. 341/20; 361/680
(58) Field of Search .................... 341/20, 22; 361/680, 361/681; 345/168, 169

(56) References Cited

U.S. PATENT DOCUMENTS

| | | | |
|---|---|---|---|
| 4,007,443 A | 2/1977 | Bromberg et al. | |
| 4,017,848 A | 4/1977 | Tannas, Jr. | |
| 4,313,227 A | 1/1982 | Eder | |
| 4,954,823 A | 9/1990 | Binstead | |
| 5,035,502 A | * 7/1991 | Stokes | 353/122 |
| 5,331,555 A | 7/1994 | Hashimoto et al. | |
| 5,404,186 A | 4/1995 | Stokes | |
| 5,432,510 A | 7/1995 | Matthews | |
| 5,440,502 A | 8/1995 | Register | |
| 5,450,079 A | 9/1995 | Dunaway | |
| 5,459,461 A | 10/1995 | Crowley et al. | |
| 5,764,180 A | 6/1998 | Cummings | |
| 5,894,039 A | 4/1999 | Tsai et al. | |
| 6,057,788 A | 5/2000 | Cummings | |
| 6,112,099 A | * 8/2000 | Ketola | 455/466 |
| 6,164,853 A | 12/2000 | Foote | |
| 6,225,976 B1 | 5/2001 | Yates et al. | |
| 6,237,846 B1 | 5/2001 | Lowell et al. | |
| 6,445,932 B1 | * 9/2002 | Soini et al. | 455/556.1 |

* cited by examiner

Primary Examiner—Albert K. Wong
(74) Attorney, Agent, or Firm—G.E. Ehrlich (1995) Ltd.

(57) ABSTRACT

A hand-held input/control device designed and configured such that, when it is held by a user oriented with its operating surface facing away from the user, the user may view the operation of the manually operable control members deployed on that operating surface.

12 Claims, 5 Drawing Sheets

HAND-HELD INPUT DEVICE PARTICULARLY USEFUL AS A KEYBOARD

FIELD AND BACKGROUND OF THE INVENTION

The present invention relates to the field of input/control devices and, more particularly, to an input/control device designed to be used with visual guidance while being held comfortably in the hands of a user. The present invention is particularly useful as a hand-held keyboard type input device for a computer.

The field of hand-held input/control devices is a particularly dynamic one, with devices of all shapes, sizes and functionalities being developed and available to the user. Each purports to offer some advantage in terms of utility, mobility, ease of use, pleasing appearance or other attractive feature or combination of features.

A wide range of examples illustrate the inventive thinking applied to the field: single hand remote control keypads include the devices shown in U.S. Pat. No. 5,432,510 and U.S. Pat. No. 4,791,408; keypad units that require both hand use are shown in U.S. Pat. No. 4,878,055 and U.S. Pat. No. 4,745,397; a pyramid shaped ergonomic keyboard for a computer is shown in U.S. Pat. No. 5,426,449; a remote control unit shaped like a pistol is shown in U.S. Pat. No. 5,253,068; a folding remote control is shown in U.S. Pat. No. 5,436,625; an inflatable keyboard is shown in U.S. Pat. No. 5,459,461; U.S. Pat. No. 5,764,180 and U.S. Pat. No. 6,057,788 both describe devices in which the fingers rest on the lower portion of a remote control keypad unit, while U.S. Pat. No. 6,164,853 discloses a device in which the keypad is located on the underside of a handheld unit. There are many others.

Although the design of the input/control units described by these prior art documents and of input/control units available commercially is directly influenced by ergonomic considerations, the multitude of designs reflects the fact that, at present, there is not a single design configuration that, by common consensus, meets the needs of a majority of users.

There is thus a widely recognized need for, and it would be highly advantageous to have, an input/control device which is designed and configured so as to enable comfortable and natural positioning of the hands when inputting user commands.

SUMMARY OF THE INVENTION

Accordingly, it is an object of the present invention to provide an input/control device that may be held comfortably in the hands of a user and operated with visual guidance by the user.

It is a further object of the present invention to provide a user with a comfortable and ergonomically sound hand-held input/control device that may be used for protracted periods of time without exposure to unnecessary fatigue, stress or cumulative trauma disorder such as repetitive stress injury.

It is a further object of the present invention to provide a keyboard type user input interface for a computer that may be used while being hand-held in the hands of a user in a natural and comfortable position.

According to a broad aspect of the present invention, there is provided a hand-held input device, comprising: a housing configured for convenient holding by two hands of a user, with an upper surface of the housing facing towards the user and an undersurface of the housing facing away from the user, and with the fingers of the user underlying the undersurface; and at least one manually operable control member carried by the undersurface of the housing facing away from the user when the housing is held by the user; the housing being constructed such as to enable the user, when holding the housing by the user's two hands with the undersurface of the housing facing away from the user, to view the fingers of the user underlying the undersurface, and to guide them for operating the control member carried by the undersurface.

According to further features in the described preferred embodiments, the housing is configured with two handgrips on its opposite sides shaped for convenient holding by the two hands of the user, with the thumbs of the user overlying the handgrips, and the fingers of the user underlying the undersurface of the housing.

In addition, each of the handgrips also includes at least one manually operable control member engageable by a thumb of the user.

According to further features in all the described preferred embodiments, the undersurface of the housing includes a plurality of the manually operable control members.

In two described embodiments, the housing is constructed with at least part thereof being light-transmissive such as to enable the user, when holding the housing by the user's two hands with the undersurface of the housing facing away from the user, to view the fingers of the user underlying the undersurface and to guide them for operating the control member carried by the undersurface. In a third described embodiment, the housing is constructed with a reflective surface located such as to enable the user, when holding the housing by the user's two hands with the undersurface of the housing facing away from the user, to view the fingers of the user underlying the undersurface and to guide them for operating the control member carried by the undersurface.

BRIEF DESCRIPTION OF THE DRAWINGS

With specific reference now to the drawings in detail, it is stressed that the particulars shown are by way of example and for the purposes of illustrative discussion of the preferred embodiment of the present invention only, and are presented in the cause of providing what is believed to be the most useful and readily understood description of the principles and conceptual aspects of the invention. In this regard, no attempt is made to show structural details of the invention in more detail that is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
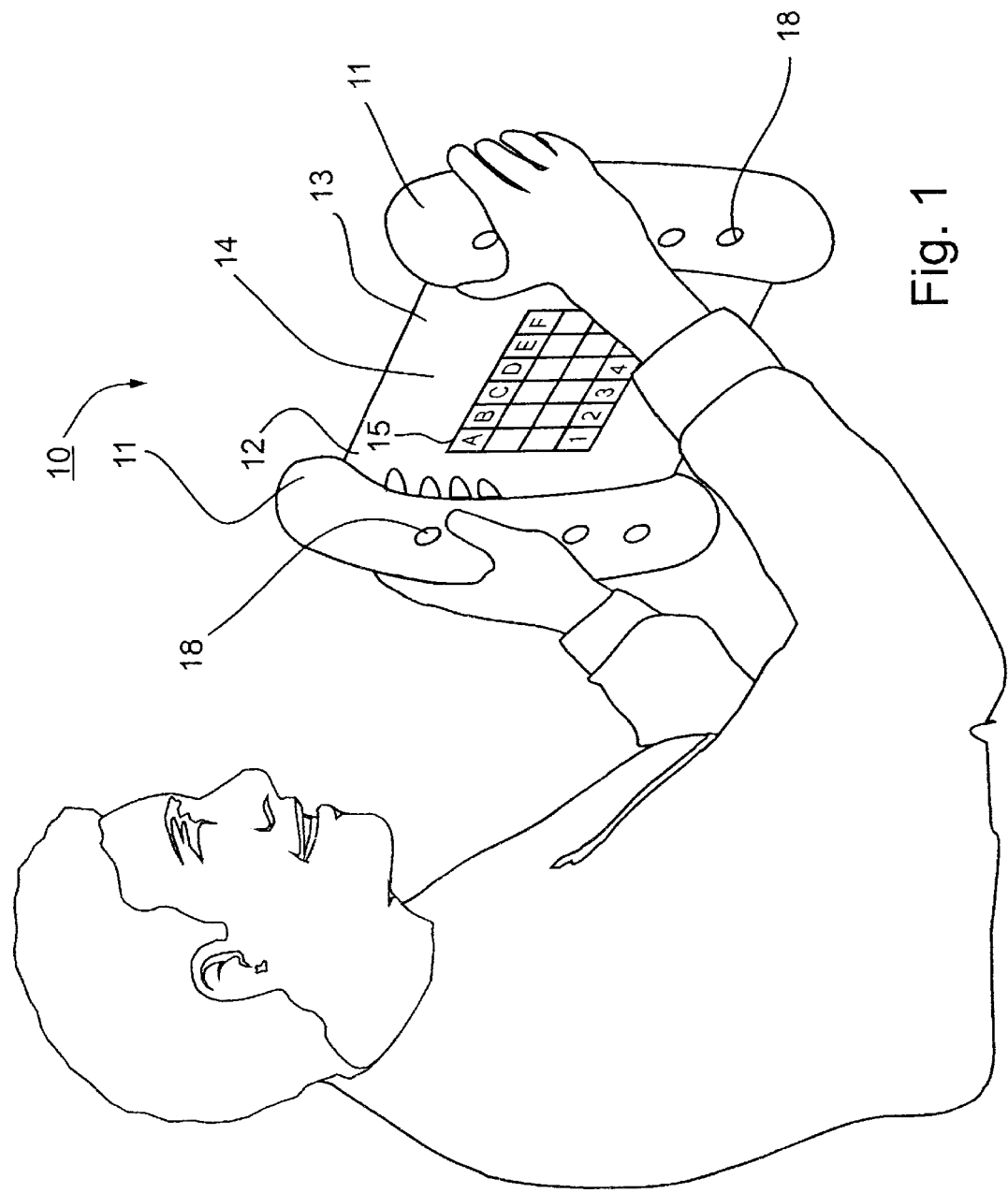
FIG. 1 is a schematic representation of a hand-held input/control device constructed in accordance with the present invention being operated by a user.

Before explaining at least one embodiment of the invention in detail, it is to be understood that the invention is not limited in this application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The principles and operation of a hand-held input device according to the present invention may be better understood with reference to the drawings and accompanying descriptions.

According to the present invention, and as illustrated in FIG. 1, there is provided a hand-held input/control device which is referred to herein as device 10.

Device 10 includes a housing 12 configured for convenient holding by two hands of a user, with an upper surface of the housing 14 facing towards the user, and an undersurface 13 facing away from the user.

As shown in FIG. 1, the housing is configured with two handgrips 11 on its opposite sides shaped for convenient holding by the two hands of the user, with the thumbs of the user overlying the handgrips, and the fingers of the user underlying the undersurface of the housing 13. Housing 12 carries, on its undersurface 13 facing away from the user, a plurality of manually operable control members 15. In the example illustrated in FIG. 1, the control members 15 are alphanumerical keys arranged in a keyboard. Thus, control members 15, rather than being carried on the upper surface of the housing as in a conventional hand-held input device, are carried by the undersurface 13, which thereby defines the operating surface of the device.

In order for a user to see operating surface 13 and to provide visual guidance to the fingers operating control member 15 deployed thereon, device 10 is provided with an area of visibility 14.

According to one preferred embodiment of the present invention, area of visibility 14 is provided by fabricating at least a portion of housing 12 so as to be light-transmissive, allowing the user to see therethrough in order to observe the fingers operating control members 15. It will be appreciated that it is not essential for area of visibility 14 to be totally transparent. It will be sufficient for area of visibility 14 to provide the user with a field of view sufficient to allow visual guidance of the fingers operating control member(s) 15. For example, area of visibility 14 can also be constructed with holes, as described below, or of a semi transparent material (e.g., colored, smoky or textured) and provided with illumination to enhance visibility.

As further seen in FIG. 1, the handgrips 11 carry further control members 18. Thus, when the user grips the two handgrips 11 as shown in FIG. 1, the thumbs of the user, overlying the handgrips are able to engage control members 18; whereas the fingers of the user, underlying the undersurface 13, are able to engage control members 15, while the user is able to view the latter control members 15 through the light-transmissive portion 14 of the housing.

According to another preferred embodiment of the present invention the light-transmissive portion 14 can be provided by fabricating housing 12 with a plurality of holes, the number and size thereof being elected so as to allow the user to view the control members 15 carried by the undersurface 13 and the user's fingers underlying the undersurface and thereby usually self guide the operation of control member(s) 15.

Figure 2:
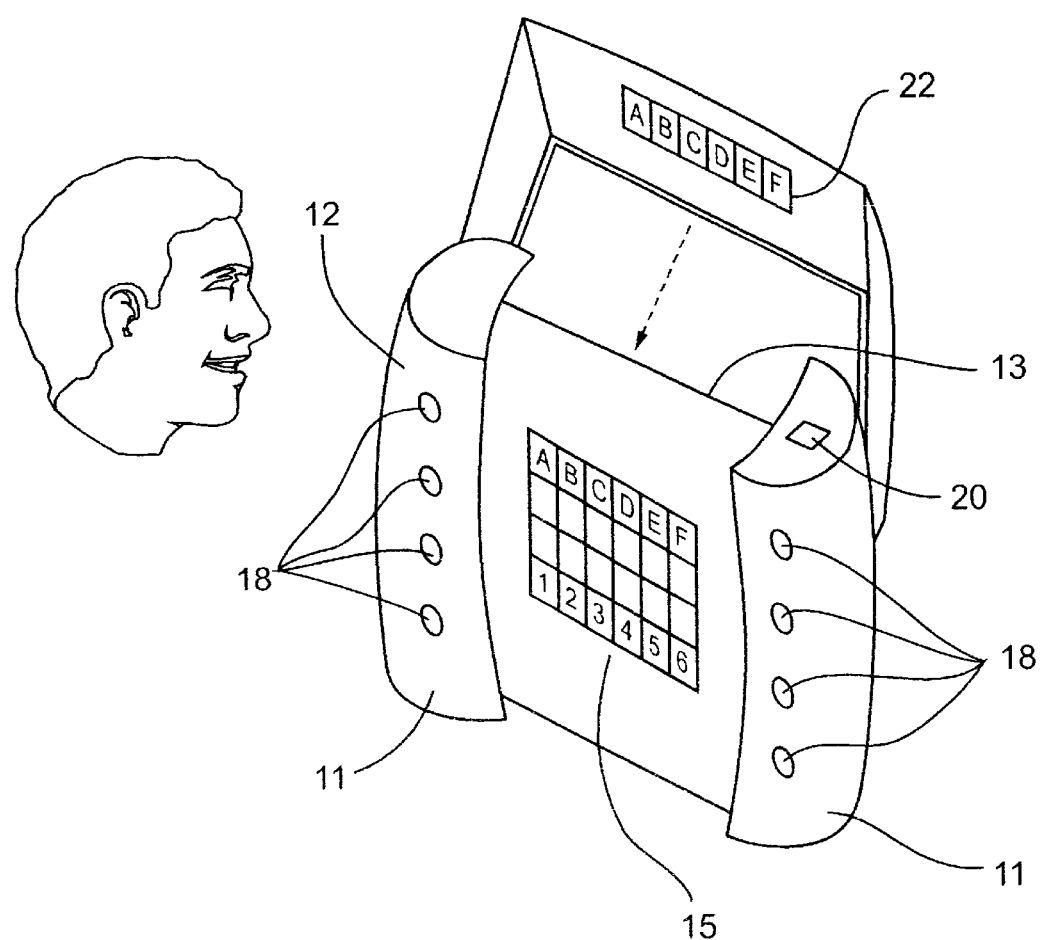
FIG. 2 is a schematic representation of another hand-held input device constructed in accordance with the present invention.

FIG. 2 illustrates another embodiment of the invention wherein the housing 12 is constructed with a reflective surface 22 located such as to enable the user, when holding the housing by the user's two hands with the undersurface 13 of the housing facing away from the user, to view the undersurface of the housing, as well as the control members 15 and the user's fingers underling the undersurface.

The present invention contemplates all constructions, configurations and materials that provide a user with sufficient visual perception of operating surface 13 so as to allow visual guidance in locating and operating any control member 15 that may be deployed thereon.

Device 10 is designed and configured to generate at least one signal in response to the operation by a user of control member(s) 15. The signal generated may be of different types, including but not limited to electrical, electronic, magnetic, optical, sonic or ultrasonic, vibratory, radio or infrared. The signal produced will depend upon the relevant embodiment and the requirements therefore, and may include data.

Device 10 is provided with at least one communication port 20 for conveying the signals generated in response to the operation of control member(s) 15. The communication port may be a hardwire port configured with the type of connector appropriate to the nature of the signals to be communicated or a wireless port capable of emitting signals that do not require hardwire transmission such as infrared or radio signals. Device 10 may incorporate Blue Tooth technology to provide maximum versatility and mobility and may utilize any present or future form of wired or wireless communication technology that serves to convey the data signals that it produces.

Device 10 is designed and configured such that control member(s) 15 serving as user input interface enable a user to employ device 10 as a control/input device for a broad range of applications. User input interface may take many forms and may include any number of control member(s) 15 configured for any function for which device 10 may be employed, including but not limited to buttons, keys, knobs, switches, joysticks, rotating disks, trackballs and touch sensitive pads. The novelty and utility of the present invention will be preserved provided that the operating surface facing away from the user, corresponding to undersurface 13 of the described preferred embodiment, is visible to the user, together with the users fingers underlying the undersurface such that any control member 15 deployed thereon may be operated by the user with visual guidance.

Figure 3:
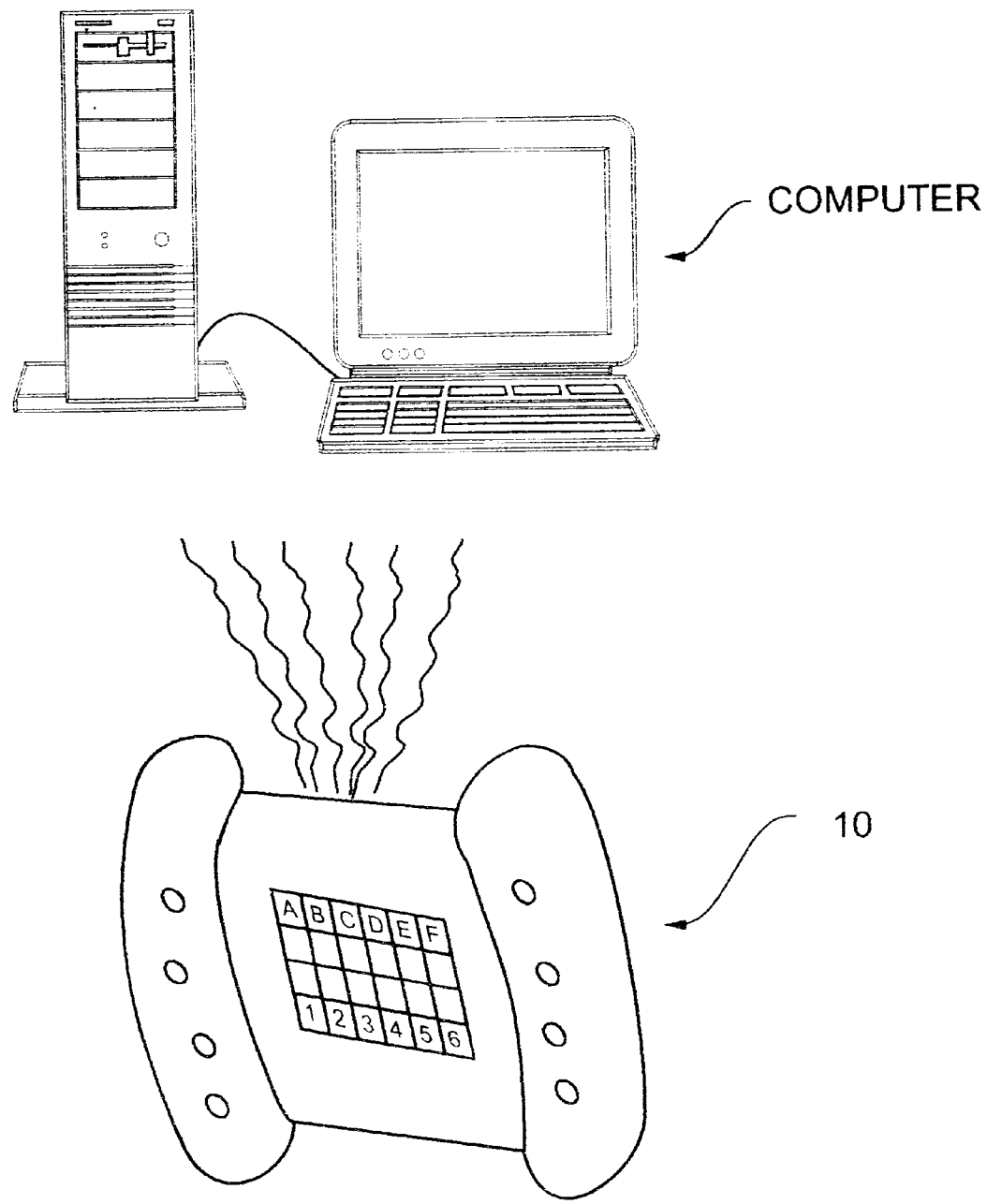
FIG. 3 is a schematic representation of the device of the present invention designed and configured as an input interface for a computer.
Figure 4:
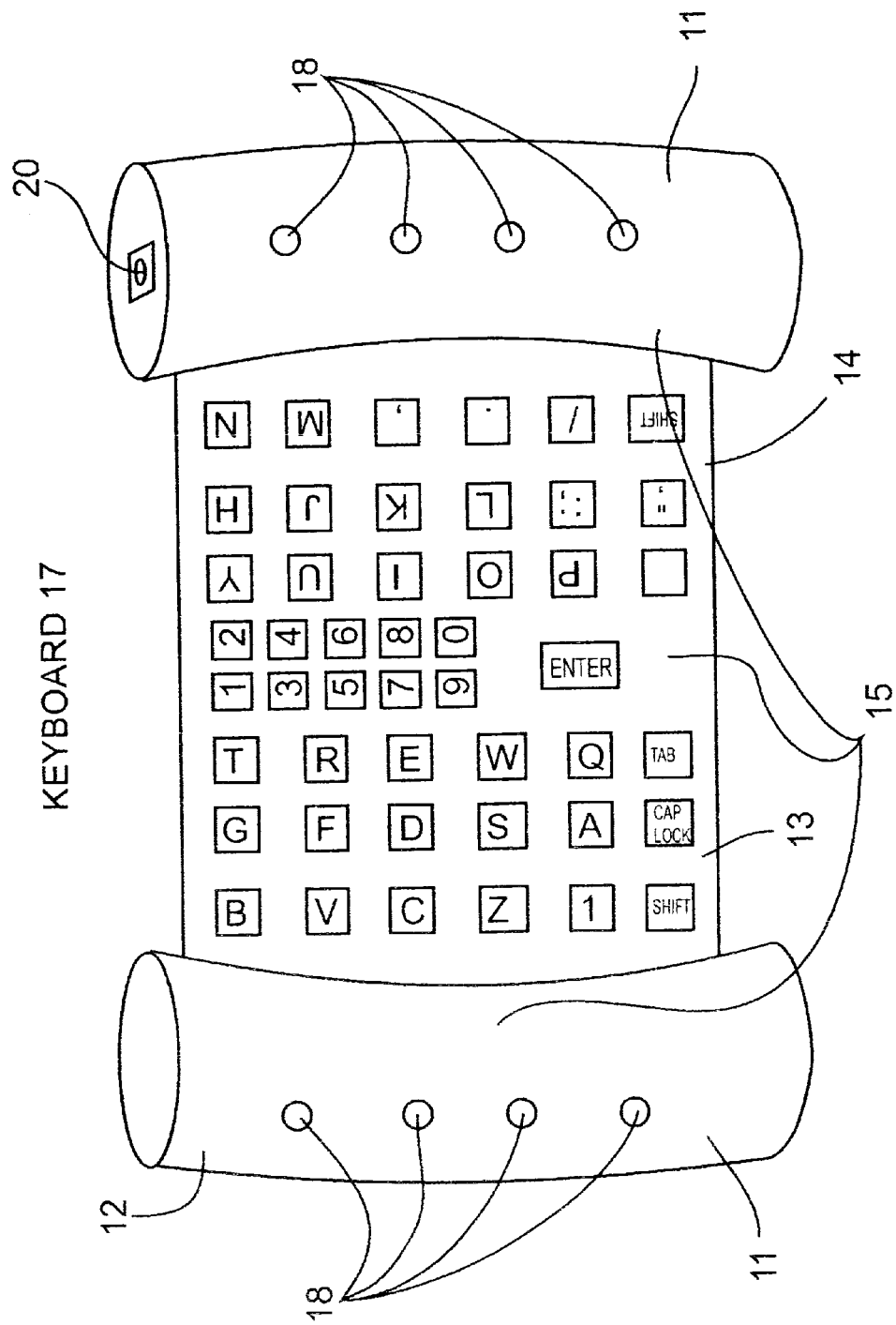
FIG. 4 is a detailed schematic representation of the device of FIG. 3.

FIGS. 2–4 illustrate device 10 of the present invention configured as a keyboard type user input interface, which is referred to hereinafter as keyboard 17.

Keyboard 17 serves the function of a standard keyboard, with control member(s) 15 configured as an alphanumeric keypad. Keyboard 17 preferably includes communication port 20 in order to convey data signals to the computer with which it is associated. In this respect, keyboard 17 may be hardwire connected to the computer with a length of wire for transmission of data signals or may be designed and configured to communicate wirelessly, which may employ infrared or radio frequency transmission to convey data signals to the computer.

As specifically shown in FIG. 2, keyboard 17 typically includes control members 15 which function as alphanumeric keys and buttons 18 functioning as command keys for formatting and function keys for mode selection.

Keyboard 17 preferably also include keys, buttons or any other input interfaces (e.g., track pad or pointer) which can be used for scrolling, cursor movement and placement, and for item and menu selection. It will be appreciated that there presently exists a wide range of computer keyboards, some more versatile and diverse than others. Keyboard 17 may therefore be configured in a range of designs and capabilities simulating keyboards from the simplest to the most complex. All are contemplated as within the purview of the present invention.

FIG. 3 illustrates keyboard 17 deployed in conjunction with a personal computer console and monitor. In this case, keyboard 17 is capable of generating data signals in response to user input in a manner similar to that of a standard computer keyboard.

Reference is now made to FIG. 4 which illustrates keyboard 17 in detail. Keyboard 17 includes a housing 12 designed and configured to be held by the user in a manner natural to the physiological orientation of the hands and arms. Accordingly, keyboard 17 includes, on each of its sides, a hand grip 11 having a three-dimensional curvilinear shape which can be easily and comfortably gripped by both hands in a palms facing-thumb proximal-fingers distal position. By gripping keyboard 17 in the manner so described, the thumbs of each hand are oriented in the direction toward the user and have easy access to input buttons 18 which can serve as control and function keys and which are located on the surface of keyboard 17 facing the user.

The fingers of each hand are oriented in the direction away from the user, that is, underlying the undersurface 13, with keyboard 17 being positioned between the fingers and the body of the user. In such an orientation and position, the fingers have easy access to control members 15 which, in this case, form a part of an alphanumeric input interface. This opposing layout enables a user to simultaneously operate input buttons 18 and control members 15.

It is an object of this embodiment of the present invention to provide a computer keyboard that is simple and easy to use, without requiring a user to learn a new system or manner of use. Accordingly, keyboard 17 may preferably replicate as far as possible a standard keyboard, with the keys designed and positioned such that each one may be struck with the finger customarily associated therewith. It is appreciated that alternative embodiments of keyboard 17 may provide keypads arranged otherwise, or may employ more or less keys, keys of different sizes, shapes, colors, surface textures or keys that are distinguished from one another in any way. Further, the keys may be distributed differently, with more or less keys deployed upon operating surface 13 and upon the surface of keyboard 17 which faces the user.

Although numerous keyboard layouts can be used by keyboard 17, each layout will share the common inventive feature of providing visibility such that keys and other manually operable control members deployed on the side of the device facing away from the user when the device is held in the hands of the user may be operated by the user with visual guidance.

The above described design and configuration of keyboard 17 allows the thumb-operation of user input buttons 18 and finger-operation of control members 15 while maintaining contact with hand grip 11, thus enabling the user to operate keyboard 17 in a comfortable and natural position while addressing limitations of both standard computer keyboards and of the many alternative keyboards presently known.

Numerous user benefits are afforded by such keyboard design.

The first benefit is user mobility. Keyboard 17 is handheld and does not require a horizontal surface for support during use. Accordingly, a user may, while using keyboard 17, move freely in the chair, stand up or stroll about. The limits of such movement are only the length of the wire in the hard wired embodiments or the broadcast range of wireless embodiments.

An additional benefit is stress and fatigue reduction. Keyboard 17 is designed to be held and used in a manner consistent with the natural position and movements of the hands and arms. When using keyboard 17, the arms, wrists and hands are not required to be held in an unnatural or uncomfortable position, such as with the palms of the hand horizontal and facing down as in standard keyboard use. Moreover, because keyboard 17 is entirely held in the hands, the user may change its position as may feel comfortable, such as raising or lowering the arms and hands, rotating its angle relative to the face, resting the elbows on the thighs or propping the forearms with the edge of a table. It is known that activities conducted with the body held in natural positions, coupled with frequent changes of position, help to prevent the occurrence of Cumulative Trauma Disorders, including Repetitive Stress Injuries such as Carpal Tunnel Syndrome which is a frequent occupationally related injury of typists.

A further benefit is ease of use. Standard keyboards are the norm for data entry to computers and "touch typing" is the preferred method of use. Keyboard 17 is easily adaptable to normative keyboard use, having a similar keypad. This feature strongly distinguishes keyboard 17 from the myriad of alternate keyboards known in the art. Alternative keyboards, particularly the smaller and portable versions, customarily employ an arrangement of keys or buttons different from the standard, often employing less keys than a standard keyboard. Using such an alternative keyboard requires a user to learn the new configuration and may require learning new techniques such as chording or pressing multiple keys simultaneously or in sequential order. Touch typists may use keyboard 17 employing customary touch typing techniques and without learning a new system or configuration of keys.

Figure 5:
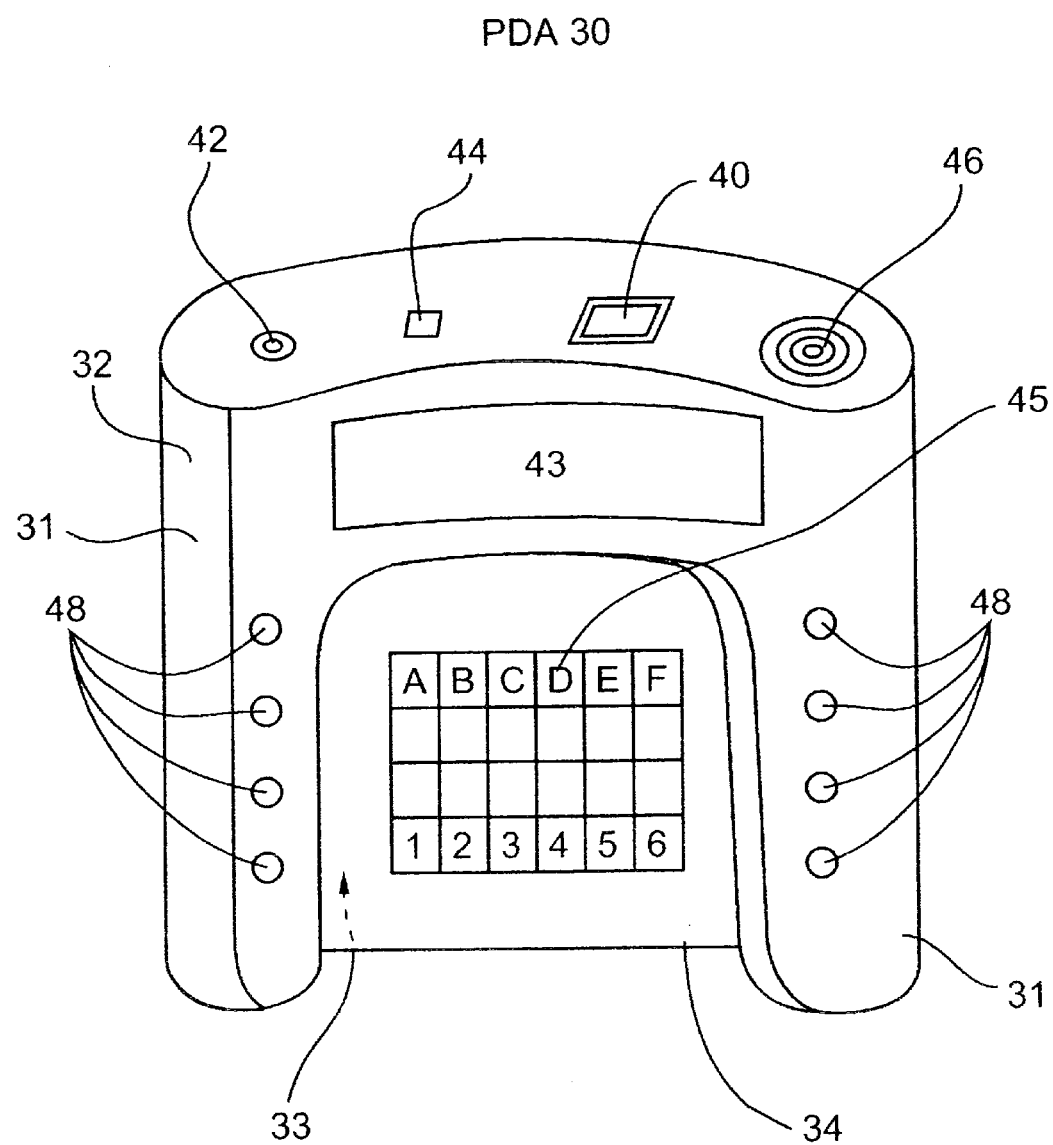
FIG. 5 is a is a schematic representation of an alternative embodiment of a hand-held input/control device constructed in accordance with the present invention.

An alternative embodiment of device 10 of the present invention is shown in FIG. 5 which illustrates a multifunctional device capable of processing data, accessing the Internet and communicating with another user, which is referred to herein as PDA 30.

As used herein, the term "PDA" means a standalone portable personal digital assistant unit, able to execute an internally stored database/memory program.

PDA 30 preferably includes all of the elements and features of a standard PDA device well known in the art, embodied in the design and configuration of device 10 which includes the novel features described hereinabove.

Accordingly, PDA 30 has a housing 32 which includes handgrips 31, operating surface 33 which bears area of transparency 34 and communication port 40 functionally analogous to their respective counterparts of device 10 described hereinabove. PDA 30 also includes various control members configured as user input interfaces appropriate to a PDA device, such as buttons 48, keypad 45 and touch sensitive screen 43. PDA 30 also includes a further input interface for audio comprising condenser microphone 44. The user output interfaces of PDA 30 comprise display screen 43 which may be a color or monochrome LCD monitor capable of displaying text, graphics, and still or moving graphic and photographic images, speaker 46 and earphone jack 42.

The most common application of such a PDA device is to operate Personal Information Management (PIM) applications. According to this alternative embodiment, PDA 30 is preferably capable of data processing and contains a database server and a memory for storing data which may be accessed by a user. Moreover, PDA 30 may be designed and configured to accept data from a plurality of sources. For example, PDA 30 may retrieve data from the World Wide Web, as will be described hereinafter, or from other database servers forming a part of the World Wide Web; it may input data directly via any of the input interface devices listed hereinbefore; and it may receive data transferred by user clients with whom it is in communication, as will be described hereinafter. Data may be of different content types encompassing publicly available data as published on the World Wide Web or user specific data entered by the user, such as address book information, calendar/agenda information, and personal, financial or other private information.

In order to retrieve data from the World Wide Web, PDA 30 includes hardware, such as a modem or an Ethernet port, and software, such as Web browser and e-mail applications necessary for establishing and maintaining Internet access.

PDA 30 may also be configured for communicating with another user operated device such as a computer, PDA, cellular telephone, facsimile device and/or Web TV, each being a unique device type as classified according to intended use, mode of communication, mobility and/or the like.

Accordingly, PDA 30 may preferably be configured as a mobile cellular telephone having an antenna, a transmitter, a receiver, and telephone circuitry, and designed to communicate via a cellular network.

As configured in the described alternative embodiment and in all further embodiments, the novelty and utility of the present invention will be preserved provided that the operating surface of PDA 30 facing away from the user when held in the hands of the user, which corresponds to operating surface 33 of the preferred embodiment of FIG. 5, is visible to the user such that manually operable control member 45 deployed thereon may be operated by the user with visual guidance.

It will be appreciated that the present invention is capable of a substantial number of alternative embodiments and uses beyond that described hereinabove. Examples of such alternative embodiments may include cellular telephone, Internet access device, electronic game console, controller of radio controlled vehicles or implements, remote control of television/VCR, remote input for a musical device or any other hand held control device for machinery or other functional objects.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather, the scope of the present invention is defined by the appended claims and includes both combinations and subcombinations of the various features described hereinabove as well as variations and modifications thereof which would occur to persons skilled in the art upon reading the foregoing description. Accordingly, it is intended to embrace all such alternatives, modifications and variations that fall within the spirit and broad scope of the appended claims.

What is claimed is:

1. A hand-held input device, comprising:
a housing configured for convenient holding by two hands of a user, with an upper surface of the housing facing towards the user and an undersurface of the housing facing away from the user, and with the fingers of the user underlying said undersurface;
and at least one manually operable control member carried by said undersurface of the housing facing away from the user when the housing is held by the user;
said housing being constructed such as to enable the user, when holding the housing by the user's two hands with the undersurface of the housing facing away from the user, to view the fingers of the user underlying said undersurface, and to guide them for operating the control member carried by said undersurface.

2. The device according to claim 1, wherein said housing is configured with two handgrips on its opposite sides shaped for convenient holding by the two hands of the user, with the thumbs of the user overlying said handgrips, and the fingers of the user underlying said undersurface of the housing.

3. The device according to claim 2, wherein each of said handgrips also includes at least one manually operable control member engageable by a thumb of the user.

4. The device according to claim 2, wherein the undersurface of the housing includes a plurality of said manually operable control members.

5. The device according to claim 1, wherein said housing is constructed with at least a part thereof being light-transmissive such as to enable the user, when holding the housing by the user's two hands with the undersurface of the housing facing away from the user, to view the fingers of the user underlying said undersurface and to guide them for operating the control member carried by said undersurface.

6. The device according to claim 5, wherein said light-transmissive part of the housing is light-transparent.

7. The device according to claim 1, wherein said housing is constructed with a reflective surface located such as to enable the user, when holding the housing by the user's two hands with the undersurface of the housing facing away from the user, to view the fingers of the user underlying said undersurface and to guide them for operating the control member carried by said undersurface.

8. A hand-held input device, comprising:
a housing configured for convenient holding by two hands of a user, with an upper surface of the housing facing towards the user and an undersurface of the housing facing away from the user, and with the fingers of the user underlying said undersurface;
and at least one manually operable control member carried by said undersurface of the housing facing away from the user when the housing is held by the user;
said housing being constructed with at least a part thereof being light-transmissive such as to enable the user, when holding the housing by the user's two hands with the undersurface of the housing facing away from the user, to view the fingers of the user underlying said undersurface and to guide them for operating the control member by said undersurface.

9. The device according to claim 8, wherein said light-transmissive part of the housing is light-transparent.

10. The device according to claim 8, wherein said housing is configured with two handgrips on its opposite sides shaped for convenient holding by the two hands of the user, with the thumbs of the user overlying said handgrips, and the fingers of the user underlying said undersurface of the housing.

11. The device according to claim 8, wherein each of said handgrips also includes at least one manually operable control member engageable by a thumb of the user.

12. The device according to claim 8, wherein the undersurface of the housing includes a plurality of said manually operable control member each including indicia viewable by the user when holding the housing.

* * * * *